(12) United States Patent
Moyer

(10) Patent No.: US 7,737,823 B2
(45) Date of Patent: *Jun. 15, 2010

(54) METHOD FOR EFFICIENTLY QUERYING AND IDENTIFYING MULTIPLE ITEMS ON A COMMUNICATION CHANNEL

(75) Inventor: Norman E. Moyer, Balboa, CA (US)

(73) Assignee: E-Tag Systems, Inc., Laguna Niguel, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/978,987

(22) Filed: Oct. 29, 2007

(65) Prior Publication Data

US 2008/0150697 A1 Jun. 26, 2008

Related U.S. Application Data

(63) Continuation of application No. 10/915,651, filed on Aug. 9, 2004, now Pat. No. 7,289,015, which is a continuation of application No. 09/625,184, filed on Jul. 21, 2000, now Pat. No. 6,774,766.

(51) Int. Cl.
 *H04Q 5/22* (2006.01)
 *G08B 5/22* (2006.01)

(52) U.S. Cl. .............................. 340/10.32; 340/825.49; 340/10.4

(58) Field of Classification Search .............. 340/10.32, 340/825.49, 10.4, 572.1, 572.3, 825.02, 825.52; 455/515; 342/42, 44; 235/492, 380, 143
See application file for complete search history.

(56) References Cited

U.S. PATENT DOCUMENTS

| | | | |
|---|---|---|---|
| 4,071,908 A | 1/1978 | Brophy | 364/900 |
| 4,476,469 A | 10/1984 | Lander | 340/825.49 |
| 4,654,658 A | 3/1987 | Walton | 340/825.54 |
| 4,703,327 A | 10/1987 | Rossetti et al. | 342/44 |
| 4,725,841 A | 2/1988 | Nysen et al. | 342/44 |
| 4,730,188 A | 3/1988 | Milheiser | 340/825 |
| 4,752,680 A | 6/1988 | Larsson | 235/492 |
| 4,783,646 A | 11/1988 | Matsuzaki | 340/572 |
| 4,797,948 A | 1/1989 | Milliorn et al. | 340/54 |
| 4,799,059 A | 1/1989 | Grindahl et al. | 340/870.03 |
| 4,862,160 A | 8/1989 | Ekchian et al. | 340/825.54 |
| 4,884,208 A | 11/1989 | Marinelli et al. | 364/460 |
| 5,008,661 A | 4/1991 | Raj | 340/825.54 |
| 5,057,095 A | 10/1991 | Fabian | 604/362 |
| 5,063,380 A | 11/1991 | Wakura | 340/825.54 |
| 5,214,410 A | 5/1993 | Verster | 340/572 |
| 5,266,925 A | 11/1993 | Vercellotti et al. | 340/572 |
| 5,294,931 A | 3/1994 | Meier | 342/44 |
| 5,339,073 A | 8/1994 | Dodd et al. | 340/825.31 |
| 5,340,968 A | 8/1994 | Watanabe et al. | 235/380 |
| 5,424,858 A | 6/1995 | Gillotte | 359/143 |
| 5,446,447 A | 8/1995 | Carney et al. | 340/572 |
| 5,450,070 A | 9/1995 | Massar et al. | 340/825.35 |

(Continued)

*Primary Examiner*—Brian A Zimmerman
*Assistant Examiner*—Nam V Nguyen
(74) *Attorney, Agent, or Firm*—Loudermilk & Associates

(57) ABSTRACT

Systems and methods for efficiently querying and identifying multiple items on a communication channel are disclosed. The inventions preferably uses radio frequency identification with interrogation devices and systems that identify radio frequency identification transponders. A depth-first tree traversal protocol algorithm, including commands and symbols, is used to more efficiently interrogate a plurality of transponders in a short amount of time.

20 Claims, 7 Drawing Sheets

U.S. PATENT DOCUMENTS

| | | | | |
|---|---|---|---|---|
| 5,489,908 | A | 2/1996 | Orthmann et al. | 340/10.32 |
| 5,519,381 | A | 5/1996 | Marsh et al. | 340/572 |
| 5,537,105 | A | 7/1996 | Marsh et al. | 340/825.54 |
| 5,550,547 | A | 8/1996 | Chan et al. | 342/42 |
| 5,550,548 | A | 8/1996 | Schuermann | 342/42 |
| 5,557,280 | A | 9/1996 | Marsh et al. | 342/44 |
| 5,572,226 | A | 11/1996 | Tuttle | 343/726 |
| 5,583,819 | A | 12/1996 | Roesner et al. | 365/225.7 |
| 5,602,538 | A | 2/1997 | Orthmann et al. | 340/825.54 |
| 5,630,064 | A | 5/1997 | Ishibashi et al. | 395/200.05 |
| 5,635,917 | A | 6/1997 | Todman | 340/825.37 |
| 5,648,765 | A | 7/1997 | Cresap et al. | 340/825.35 |
| 5,666,417 | A | 9/1997 | Liang et al. | 380/23 |
| 5,684,976 | A | 11/1997 | Soheil-Arasi et al. | 711/128 |
| 5,689,238 | A | 11/1997 | Cannon, Jr. et al. | 340/568 |
| 5,751,221 | A | 5/1998 | Stanfield et al. | 340/825.35 |
| 5,774,876 | A | 6/1998 | Woolley et al. | 705/28 |
| 5,779,839 | A | 7/1998 | Tuttle et al. | 156/213 |
| 5,841,770 | A | 11/1998 | Snodgrass et al. | 370/346 |
| 5,856,788 | A | 1/1999 | Walter et al. | 340/825.54 |
| 5,936,527 | A | 8/1999 | Isaacman et al. | 340/572.1 |
| 5,986,570 | A | 11/1999 | Black et al. | 340/825.54 |
| 6,002,344 | A | 12/1999 | Bandy et al. | 340/825.54 |
| 6,072,801 | A * | 6/2000 | Wood et al. | 370/437 |
| 6,127,928 | A | 10/2000 | Isaacman et al. | 340/572.1 |
| 6,177,858 | B1 | 1/2001 | Raimbault et al. | 340/10.1 |
| 6,226,300 | B1 | 5/2001 | Hush et al. | 370/437 |
| 6,307,848 | B1 * | 10/2001 | Wood, Jr. | 370/329 |
| 6,321,230 | B1 | 11/2001 | Joslin et al. | 707/100 |
| 6,469,618 | B1 | 10/2002 | Gaultier | 340/10.3 |
| 6,724,297 | B1 | 4/2004 | Vacherand et al. | 340/10.3 |
| 6,727,803 | B2 | 4/2004 | Hulvey | 340/10.31 |
| 6,774,766 | B1 | 8/2004 | Moyer | 340/10.32 |
| 6,967,564 | B2 | 11/2005 | Hulvey | 340/10.31 |
| 7,173,518 | B2 | 2/2007 | Hulvey | 340/10.31 |
| 7,289,015 | B2 | 10/2007 | Moyer | 340/10.32 |

* cited by examiner

METHOD FOR EFFICIENTLY QUERYING AND IDENTIFYING MULTIPLE ITEMS ON A COMMUNICATION CHANNEL

This application is a continuation of U.S. application Ser. No. 10/915,651, filed Aug. 9, 2004, now U.S. Pat. No. 7,289,015, which is a continuation of U.S. application Ser. No. 09/625,184, filed Jul. 21, 2000, now U.S. Pat. No. 6,774,766, both of which are hereby incorporated by reference.

FIELD OF THE INVENTION

The present invention relates to devices and systems for efficiently querying and identifying multiple items on a communication channel preferably using radio frequency identification, and more particularly to interrogation devices and systems that identify radio frequency identification transponders.

BACKGROUND OF THE INVENTION

Radio Frequency Identification (RFID) is a technology that is used to locate, identify and track many different types of items, such as clothing, laundry, luggage, furniture, computers, parcels, vehicles, warehouse inventory, components on assembly lines, and documents. RFID transponders, such as illustrated by RFID tags 6 in FIG. 1, are used in much the same way as optical bar codes, identifying the item to which they are affixed as being a particular individual or as being part of specific group. Unlike bar codes, RFID transponders can be read even when they cannot be seen, and hence a "direct line of sight" for transmitted RF energy 4 and reflected RF energy 8 is not required between interrogation device 2 and the transponder. Furthermore, the identification numbers of a multiplicity of transponders 6 can be read virtually simultaneously, with little or no effort on the part of the user to "aim" the interrogation device at each and every transponder. Some RFID transponders can store information in addition to that used for identification. This additional information may also be re-programmable by the user. Information within the transponder is typically accessed by a process variously referred to in the art as "scanning," "reading," or "interrogating."

RFID transponders are typically interrogated by a radio transceiver with some added intelligence to enable it to send and receive data in accordance with a communication protocol designed into the transponder. When interrogating one or more transponders, the transceiver transmits RF energy 4 to the transponder, and encodes information on the outgoing signal by modulating the amplitude, phase and/or frequency of the signal. The RFID transponder can receive this signal and interpret the information sent by the interrogating device, and may also then respond by sending information contained in reflected RF energy 8 back to the interrogating device.

RFID transponders are often classified as either active or passive. An active transponder is continuously powered by a battery or alternate power source. In contrast, a passive transponder obtains its power from the RF field imposed upon it by an RFID transponder interrogation device. A passive RFID transponder, therefore, must remain close enough physically to the interrogating device to obtain adequate power to operate its circuits. Typically, the range for a passive transponder will be less than that of an active transponder, given that the interrogating device is transmitting the same amount of RF power at the same frequency for both types of transponders.

RFID transponders may be constructed from discrete components on a circuit board or they may be fabricated on a single silicon die, using integrated circuit (IC) techniques and needing only the addition of an antenna to function. Transponders are generally designed to operate in one of a number of different frequency bands. Popular frequencies are centered around 125 kHz, 13.56 MHz, 915 MHz and 2.45 GHz. These particular frequencies are chosen primarily because regulations in many countries permit unlicensed operation in these bands, and the permitted transmission power levels are suitable for communicating with and/or providing power to the RFID transponders. Transponders operating at lower frequencies (e.g. 125 kHz and 13.56 MHz) generally require larger antennas, and typically employ inductive coupling via multiple-turn coils to achieve a small antenna size. High frequency transponders typically utilize electric field coupling via simple half-wavelength dipole antennas. For example, 2.45 GHz transponders can use simple paper-thin, printed-conductor antennas as small as 60 mm by 5 mm. In contrast, 125 kHz transponders typically use a coil antenna, usually either made of many loops of wire or of a foil spiral affixed to a substrate material. In low frequency transponders, both coils and printed spirals must be quite large in order to achieve an appreciable operating range. Examples of such transponders may be found in U.S. Pat. Nos. 4,654,658 and 4,730,188.

RFID transponders are typically identified by a number contained within a memory structure within each transponder. This memory structure may be programmed in a variety of ways, depending on the technology used to implement the memory structure. Some transponders may employ factory-programmable metal links to encode the ID. Others may employ one-time-programmable (OTP) methods, which allow the end user to program the ID. This is often referred to as Write Once, Read Many (WORM) technology, or as Programmable Read Only Memory (PROM). Both fusible links and anti-fuse technologies are used to implement this method of storage. Still other technologies allow the user to program and re-program the ID many times. Electrically Erasable Programmable Read Only Memory (EEPROM) and FLASH memory are examples of technologies that can be used to implement this type of access. The transponder ID number is typically stored in a binary format for ease of implementation, though other representations could be used.

When multiple RFID transponders are within range of the interrogating device, it is typically desired to be able to identify all of the transponders in the field. Once the transponders have been identified, their presence may be noted in a computer database. Following identification, each of the transponders may also be addressed individually to perform additional functions, such as the storing or retrieving of auxiliary data.

The ability of the system to efficiently identify the presence of a multiplicity of transponders is highly dependent upon the communications protocol used to interrogate the transponders. Among those familiar with the art, a protocol suitable for allowing multiple transponders to respond to an interrogation request is typically referred to as an "anti-collision protocol." The process of singling out one transponder for communication is typically referred to as the process of "isolation."

Most anti-collision protocols communicate between an interrogation device and RFID transponders present in an RF field have relied upon pseudo-random number (PN) generators. PN generators are typically used to vary the time during which the transponders may respond, so as to eventually allow a response from each transponder to reach the interrogation device without colliding destructively with the response from another transponder. Examples of such protocols can be found in U.S. Pat. Nos. 5,537,105, 5,550,547, and 5,986,570.

A drawback of using PN generators is that it is difficult to predict the time required to identify all of the transponders in the field, given that a certain number of transponders are in the field; hence, the time required is non-deterministic, even when the identities of the transponders being read are known. The use of random or pseudo-random intervals also necessitates the use of large time gaps between transponder transmissions to decrease the likelihood of collision between the transponder transmissions. This slows down the transponder communication process and drastically decreases the number of transponders that can be identified during a given amount of time. Previous anti-collision protocols utilizing PN generators have claimed to have the ability to achieve sustained read rates of up to approximately 80 transponders per second. Some protocols can read a single transponder in as little as 1 ms, but as the number of transponders in the field multiplies, PN generator-based protocols decline in performance, significantly increasing the average per-tag read time required.

Non-PN generator-based protocols known to be available are described in U.S. Pat. Nos. 5,339,073 and 5,856,788. The methods described in these patents interrogate the identification in a bit-by-bit fashion. These methods allow many transponders to reply to an interrogation simultaneously, but in a way that the interrogation device can still determine whether or not at least one transponder responded.

The protocol described in U.S. Pat. No. 5,856,788 is similar to a protocol used to uniquely identify and automatically configure expansion cards presently common in personal computers (PCs) employing the Industry Standard Architecture (ISA) expansion bus (as described in the "Plug and Play (PNP) ISA Specification" by Intel and Microsoft). The protocol described in U.S. Pat. No. 5,856,788 and the ISA PNP protocol are designed to interrogate a unique identification number in a bit-by-bit fashion. The interrogated device, which may be a transponder or a PC expansion card, responds to a request for a specific bit by returning a symbol for a logic one, if the respective bit is of a specific predetermined value (usually one). If the respective bit in the device is not of the specific predetermined value, no response is returned. Responses are designed such that many devices may respond simultaneously without interfering with one another. If a response is received, the interrogating device may then conclude that at least one device exists containing the predetermined value in the requested bit location. After receiving a response, the interrogation device will then command all transponders that did not respond to enter an idle state. If no response is received, the interrogation device must assume that a transponder with a zero in the bit position just interrogated may be present, and the next bit is then interrogated. This process is repeated for the remaining bits until a single transponder remains in a non-idle state. This transponder is then said to be isolated.

When no response is received by the interrogation device for any given bit being interrogated, the interrogation device cannot determine whether the lack of a response was due to the presence of a tag with a zero in the bit position just interrogated or to the complete absence of tags which are able to respond.

Hence, both the protocol described in U.S. Pat. No. 5,856,788 and that used by ISA PNP terminate once the reception of an ID number which consists of all zero-valued bits is detected. Any time an identification process is commenced, this "phantom" transponder ID number must always be read in order to terminate the identification process. Furthermore, should a transponder suddenly be removed from the communication medium during an interrogation, the interrogating device would then misinterpret the lack of responses during the remainder of the interrogation as being indicative of a value of zero for the remaining bits. Further verification must be performed to assure that the ID received is correct. This is obviously undesirable, and adds unnecessary overhead to the protocol. This method also does not lend itself well to applications utilizing ID numbers stored in non-binary formats.

The method described U.S. Pat. No. 5,339,073 is similar to that described in U.S. Pat. No. 5,856,788, but provides a time slot for each possible value in each field being interrogated. Each field can be considered to contain a single digit of the ID number of the transponder. For binary-valued fields, two time slots are provided. The provision of a response for all possible field values accommodates non-binary ID storage, and eliminates the necessity of reading an all-zero ID number as in the method of U.S. Pat. No. 5,856,788. This method requires that the sequence of field values, which led up to an interrogation resulting in transponders responding, be recorded and later retransmitted in order to select specific groups of transponders for further interrogation. This process is repeated until the ID number of each transponder has been completely determined. The retransmission process adds unnecessary overhead to the identification process.

A system for locating documents or other objects is disclosed in U.S. Pat. No. 5,936,527. The invention disclosed herein was designed for, and hence is well suited for application in such a system, as it provides for the rapid interrogation of large numbers of transponders in a short period of time.

A typical RFID interrogation device (which may be used with the present invention) is shown in FIG. 2, wherein circulator 12 sends a predetermined series of transmissions and a typical RFID transponder 6 (see FIG. 3) receives the transmission at antenna 28, which is coupled to receive circuit 32. The reception of RF energy, as illustrated in FIG. 3, also may be used to generate power via power generator 30, which supplies power for activating receive circuit 32, control circuit 36, ID memory 38, and transmit circuit 34 (i.e., the components of transponder/tag 6). ID memory 38 stores identification data, while control circuit 36 keeps track of the transmissions received and controls transmit circuit 34 to respond to a transmission when required, which may be based on a comparison with identification data stored in ID memory 38, etc.

As illustrated in FIG. 2, antenna 10 receives transponder reply transmission 8, which is coupled to band pass filter 14 in interrogation device 2. The filtered, received signal is demodulated and detected by control microprocessor 20 via receive down-converter 16 and demodulation circuit 18. Microprocessor 20 controls phase locked loop 22, which provides a carrier signal to down-converter 16 and modulator 24. Control microprocessor 20 provides the next transmission data to modulator 24 that is amplified by power amplifier 26 and coupled to circulator 12 to begin the interrogation response cycle anew.

The circuits described in connection with FIGS. 2 and 3 should be considered exemplary, and other general RF transceiver circuits also are known in the art. What distinguishes the present invention from known systems and methods, however, is the protocol, specifically the manner in which the interrogating system transmits interrogating signals to the transponder and the manner in which the transponder transmits reply signals back to the interrogating system. The language of the protocol is illustrated in timing diagrams in FIGS. 4 and 5, while the protocol for the interrogating system and the transponder is illustrated in flowcharts in FIGS. 6 and 7, respectively.

SUMMARY OF THE INVENTION

In accordance with the present invention, improved protocols and methods are provided for an interrogation device (hereafter "interrogating system") to identify RFID transponders faster than conventional methods, thus allowing for increased scanning speed.

In a preferred embodiment of the present invention, a protocol is provided that may be used in conjunction with a passive RFID transponder made to operate in the 915 Mz and/or 2.45 GHz bands. This type of high frequency transponder typically consists of a small silicon die with receiving and transmitting circuitry, and a printed antenna bonded to the die, both of which are sandwiched between small pieces of plastic film, which protect the die and antenna. The interrogating system communicates with the RFID transponder by modulating the amplitude of the transmitted RF signal at specific time intervals. In a preferred embodiment, the modulation is effected by sharply attenuating the transmitted RF signal. The transponder communicates with the interrogating system by shorting its antenna at certain intervals in response to the RF attenuation. By shorting its antenna, the transponder causes a reflection, which in turn produces a disturbance in the field being radiated by the interrogating system. This is referred to in the art as "backscatter" modulation.

The present invention provides a method for reading RFID transponders, which is not only faster than current conventional methods but is deterministic given a set of transponders to be read. These features allow one to determine exactly how much time is required to read a given number of transponders with known identities; they also allow one to arrive at mathematical expressions for upper and lower bounds for the time required to read a given number of transponders whose identities are unknown. Since random number generators are not used, the only random elements of the transponder-reading process are introduced by the fact that the transponder identities are not typically known a priori, and by the random nature of the RF communications channel, which is subject to range limitations and interference.

One of ordinary skill in the art should recognize that the protocol could also be applied over a wired communications channel, such as a computer bus or a computer network, to query the identities of objects connected to the communication channel medium. Error rates on wired channels are often low enough to be ignored, leaving only the unknown object identities to impose a random nature on the time required for the protocol to identify all objects on the channel.

In the field of RFID, it is often important to be able to read the ID numbers of a multiplicity of transponders as quickly as possible. In particular, for applications in which many transponders pass in front of a stationary reader, or in which the reader must pass over many stationary transponders, the speed with which transponders can be read and identified is a critical performance parameter. Clearly, the more items that can be processed per unit time, the more useful the system becomes. Applications such as document tracking, asset tracking, and luggage and parcel sorting may all benefit greatly from an increase in scanning speed. Thus, the present invention may serve to further enhance the value of distributed interrogation systems, such as the type described in the aforementioned U.S. Pat. No. 5,936,527.

The present invention uses an adaptation of a tree traversal algorithm to identify all transponders in the RF field. In the nomenclature of those skilled in the art of computer science, the algorithm can be referred to as a "depth-first" tree traversal. This type of algorithm is in contrast with a "breadth-first" tree traversal. The present invention offers an improvement over the method of U.S. Pat. No. 5,856,788, in that it provides a response for all objects being identified, regardless of the value of the bit being interrogated; it provides a novel improvement over the method of U.S. Pat. No. 5,339,073, which uses a breadth-first approach, in that it eliminates the need to retransmit most of the sequences of field values in the course of the interrogation process.

It should be apparent to one skilled in the art that the invention herein described is applicable to other applications and fields in which an unknown number of items may be present on a communication channel, and for which a need exists to uniquely query and identify each of the items present. The invention may be implemented on a communications channel which may be wired, or which uses wireless communication in the form of radio frequency, optical, or acoustic signals.

Accordingly, one object of the present invention is to provide improved systems and methods for reading RFID-type transponders that are faster than previous methods.

Another object is to provide systems and methods for reading RFID-type transponders that are deterministic given a set of transponders to be read.

A further object of the present invention is to provide improved systems and methods that perform the rapid interrogation of large numbers of RFID-type transponders in a short period of time.

Yet another object is to substantially increase scanning speed for RFID-type transponders.

Still another object is to allow many RFID-type transponders to reply to an interrogation simultaneously and provide a response for all objects being identified, regardless of the value of the bit being interrogated.

Another object of the present invention is to eliminate the need to retransmit most of the sequences of field values in the course of the interrogation process.

BRIEF DESCRIPTION OF THE DRAWINGS

The present invention may be more fully understood by a description of certain preferred embodiments in conjunction with the attached drawings, in which.

DETAILED DESCRIPTION OF THE PREFERRED EMBODIMENTS

The present invention will be described in greater detail with reference to certain preferred embodiments and certain other embodiments, which may serve to further the understanding of preferred embodiments of the present invention. As described elsewhere herein, various refinements and substitutions of the various embodiments are possible based on the principles and teachings herein.

For simplicity, it is assumed in the preferred embodiments that the fields of the IDs being interrogated are binary valued. It should be understood that the present invention is not intended to be limited to such binary valued implementations.

The preferred embodiment provides for the transponder to be in one of two modes: a MATCH mode and a READ mode. The MATCH mode is the default mode, wherein the transponder will only send data back to the interrogating system if the transponder detects that the interrogating system has sent out an ID number which matches the ID number in the transponder. In the READ mode, the transponder will serially shift out the bits of its ID number in response to commands from the interrogating system. The transponder can be placed into this mode through the use of a special command called the "CHANGE1" command.

In the description of the protocol operation, it is assumed herein that the ID number is stored in a binary format and the first bit read from the transponders will always be the most significant bit (MSB) of the ID number. With this assumption of the bit order, the protocol of the present invention uniquely identifies the transponders in descending order according to their binary ID numbers. Once a transponder has been uniquely identified, it will return to an idle mode awaiting a RESET command before it can be read again.

Figure 1:
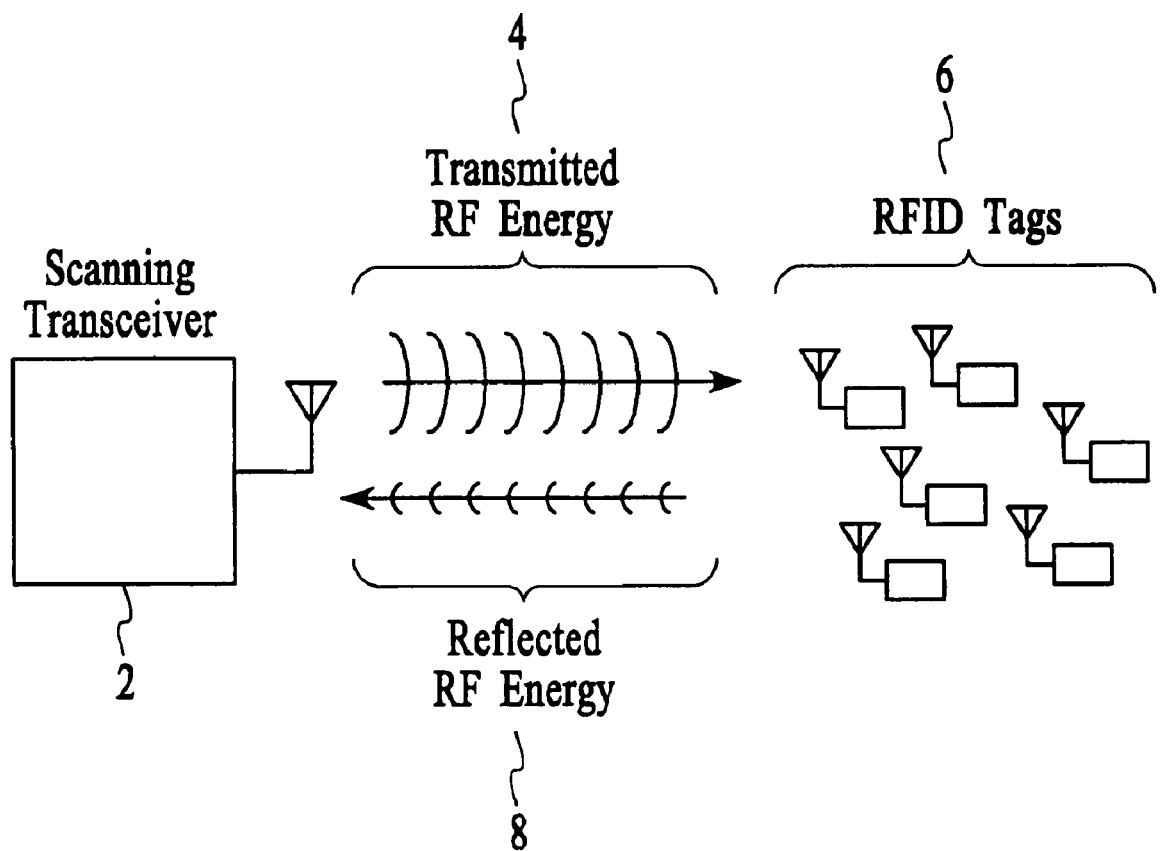
FIG. 1 is a block diagram for a typical RFID system.
Figure 2:
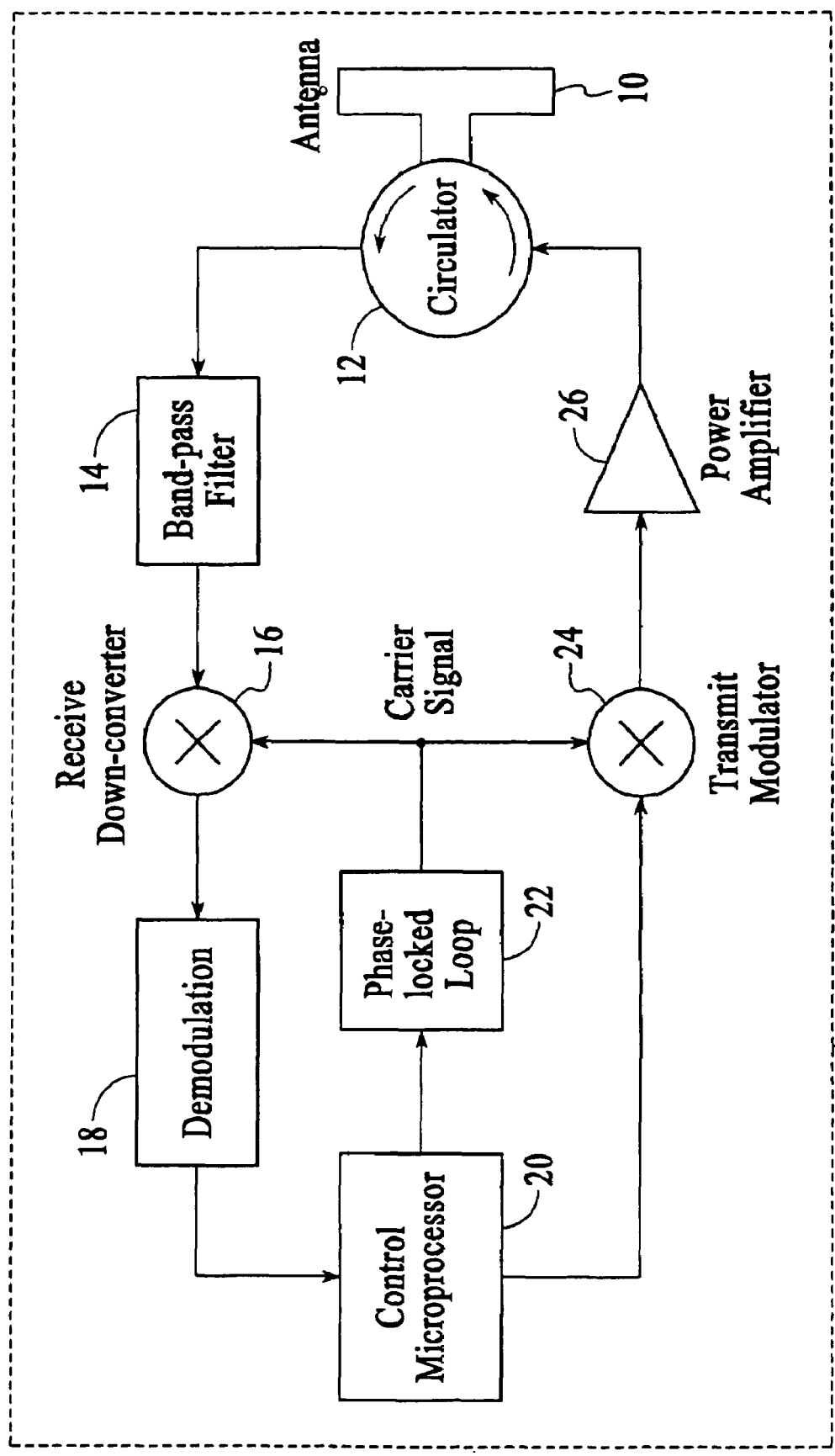
FIG. 2 is a block diagram for a typical passive RFID transponder.
Figure 3:
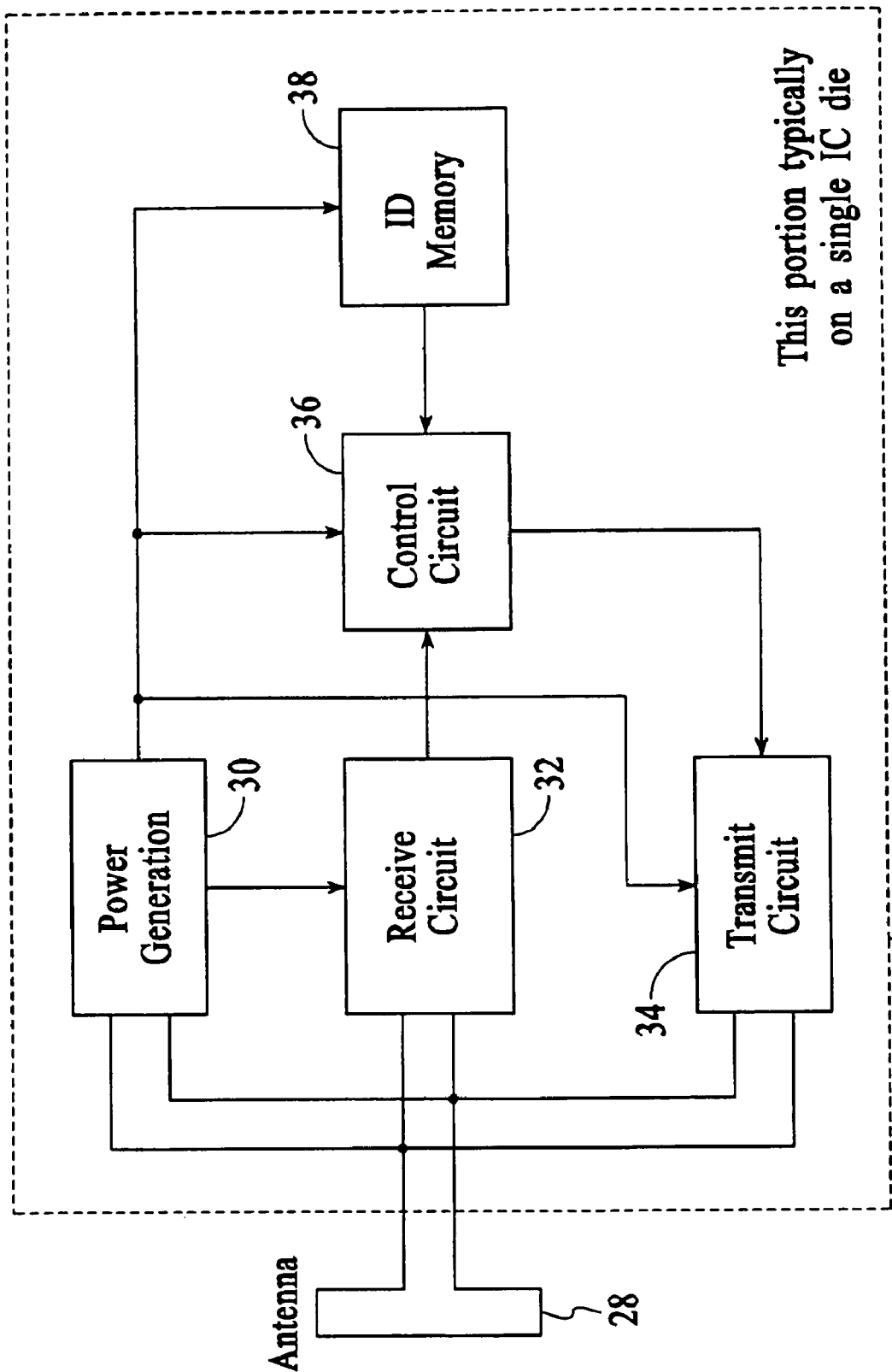
FIG. 3 is a block diagram for a typical RFID interrogation system.
Figure 4:
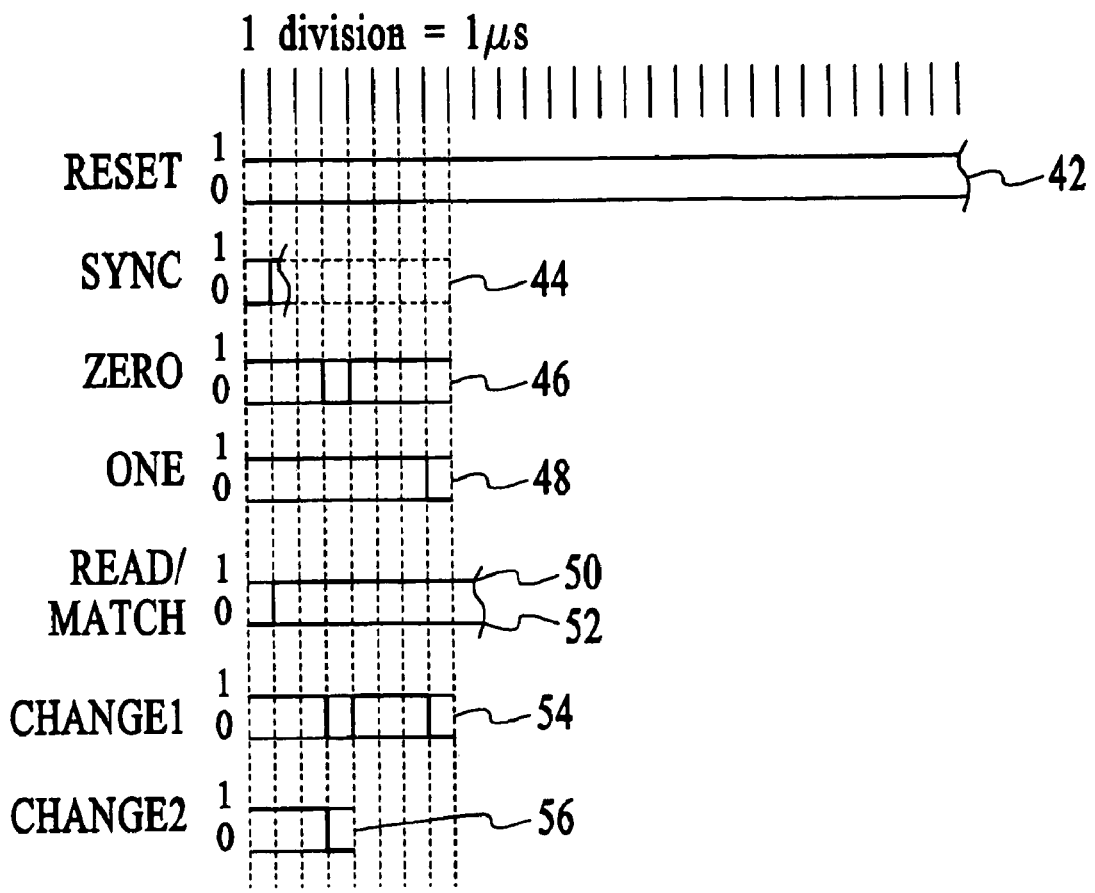
FIG. 4 is a timing diagram that illustrates the symbolic alphabet used by an interrogation system in accordance with preferred embodiments to communicate with the transponder.

The timing diagrams of FIG. 4 provide a graphical representation of a preferred embodiment of the command and data symbols used to transmit data from the interrogating system to the RFID transponders. Data is encoded using a form of pulse position modulation (PPM). To communicate with the transponder, the following command and data symbols preferably are implemented.

Timing diagram 42 illustrates the RESET command. The transponders perform a RESET operation after they sense a specific duration of constant RF illumination from the interrogating system. This duration must be longer than the maximum duration of continuous RF illumination encountered during the execution of the remainder of the protocol. In the preferred embodiment, this duration is 28 microseconds (μs).

Timing diagram 44 illustrates the SYNC command. The first pulse received following the RESET period is considered to be a SYNC command. The SYNC command tells the RFID transponder that communication to the transponders is beginning. In the preferred embodiment, the SYNC pulse has a duration of 1 μs, and is a period during which the RF illumination of the transponders is heavily attenuated by the interrogating system.

Timing diagram 46 illustrates the symbol for a value of ZERO for a single binary digit. In the preferred embodiment, this symbol is composed of 3 μs of RF illumination, followed by 1 μs during which the RF illumination is attenuated, and another 4 μs of RF illumination.

Timing diagram 48 illustrates the symbol for a value of ONE for a single binary digit. In the preferred embodiment, this symbol is composed of 7 μs of RF illumination, followed by 1 μs during which the RF illumination is attenuated.

Timing diagram 50 illustrates the READ command. The READ command directs the transponder to send out one bit of its ID number. After transmitting the bit, the transponder increments its internal memory pointer and awaits further commands from the interrogating system. In the preferred embodiment, this command consists of 1 μs during which the RF illumination is attenuated, followed by a period of continuous RF illumination (which must be less than the RESET's duration) during which the transponder may communicate with the interrogating system by shorting its antenna for brief intervals. In the preferred embodiment, after a RESET command, the READ command cannot be issued until a CHANGE1 command is issued.

Timing diagram 52 illustrates the MATCH command. The MATCH command directs the transponder to send out a MATCH acknowledgement symbol if the transponder's ID bits match those sent by the interrogating system since the last RESET command was issued. In the preferred embodiment, this symbol is identical to the READ symbol, but is differentiated from the READ command by the fact that no change commands are sent between the RESET command and the MATCH command. Furthermore, the MATCH command can be received only after the correct number of bits has been received from the interrogating system.

Timing diagram 54 illustrates the CHANGE1 command. The CHANGE1 command directs the transponder to switch into the READ mode. In the preferred embodiment, this symbol is composed of 3 μs of RF illumination, followed by 1 μs during which the RF illumination is attenuated, followed by another 3 μs of RF illumination, followed by another 1 μs during which the RF illumination is attenuated. This command also has the same effect as a READ command, in that it causes the transponder to send out one bit of its ID number.

Timing diagram 56 illustrates the CHANGE2 command. The CHANGE2 command directs the transponder to go into a sleep state if the last READ command issued to the transponder caused the transponder to send a zero to the interrogating system. This command is typically issued when both a ONE and a ZERO symbol are transmitted back from the transponder in response to a READ command. This symbol is composed of a period of 3 μs of continuous RF illumination, followed by 1 μs during which the RF illumination is attenuated.

Figure 5:
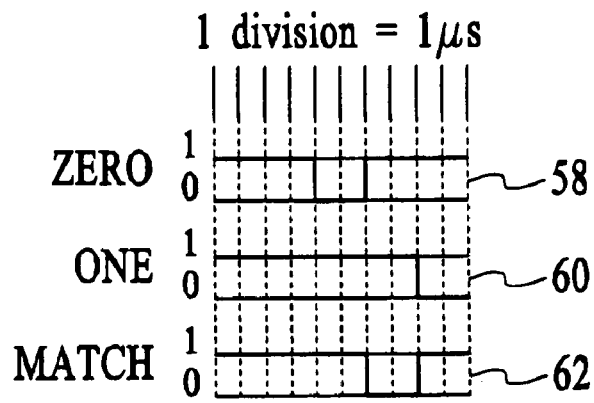
FIG. 5 is a timing diagram that illustrates the symbolic alphabet used by the transponder in accordance with preferred embodiments to communicate with the interrogating system.

The timing diagrams of FIG. 5 provide a graphical representation of a preferred embodiment of the communication symbols used to transmit data from the RFID transponders to the interrogating system. In accordance with preferred embodiments, the RFID transponder communicates with the interrogating system by shorting its antenna during periods when the interrogating system is transmitting a continuous level of RF illumination. By shorting its antenna, the transponder creates a reflection of RF energy that the interrogating system can detect. The RFID transponder's alphabet of communication symbols preferably include the following symbols.

Timing diagram 58 illustrates the symbol for a ZERO value, which represents a binary zero contained in the RFID transponder's ID number. In the preferred embodiment, this symbol consists of a waiting period of 4 μs after the last sync pulse received from interrogator followed by a 2 μs period during which the transponder shorts its antenna, followed by a 4 μs period during which the transponder again waits. This symbol will only be sent immediately after RF illumination is resumed following a READ, CHANGE1, or CHANGE2 command from the interrogating system.

Timing diagram 60 illustrates the symbol for a ONE value, which represents a binary one contained in the RFID transponder's ID number. In the preferred embodiment, this symbol consists of a waiting period of 8 μs after the last sync pulse received from interrogator followed by a 2 μs period during which the transponder shorts its antenna. This symbol will only be sent immediately after RF illumination is resumed following a READ, CHANGE1, or CHANGE2 command from the interrogating system.

Timing diagram 62 illustrates the MATCH symbol. A MATCH symbol consists of a waiting period of 6 μs followed by a 2 μs period during which the transponder shorts its antenna, followed by a 2 μs period during which the transponder again waits. This symbol will only be sent immediately after RF illumination is resumed following a MATCH command from the interrogating system, and only if the RFID's transponder ID matches the number transmitted by the interrogating system. The MATCH symbol will be repeated as long as the interrogating system continues to send successive MATCH commands.

Figure 6:
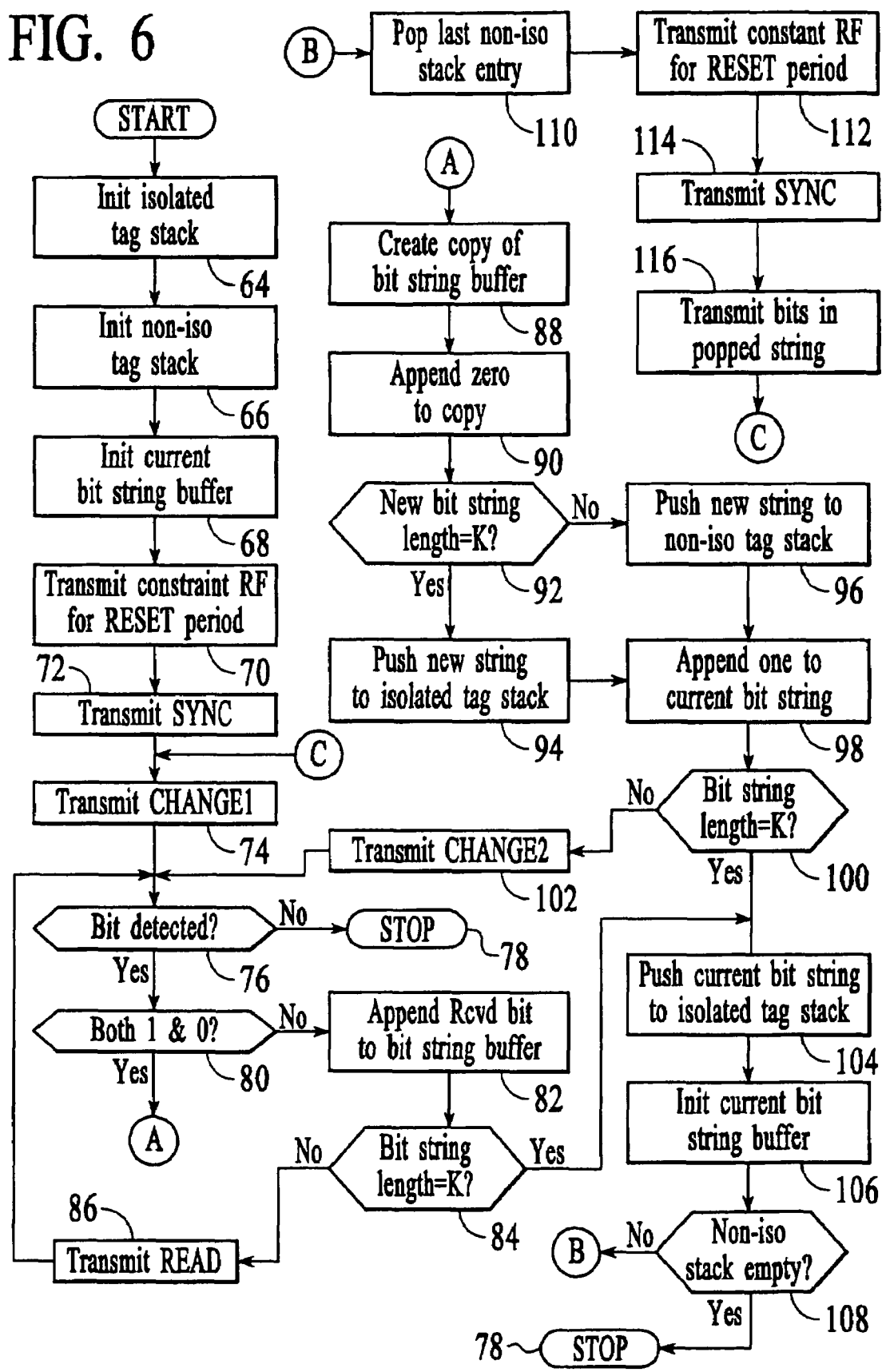
FIG. 6 is a flow chart of a representative algorithm for implementing a preferred embodiment of the present invention, as it pertains to an interrogating system.

FIG. 6 illustrates a preferred algorithm performed by the interrogating system to read multiple transponders. The algorithm preferably makes use of an abstract data structure known as a stack. Data is added to the stack in a "push" operation. A "pop" operation will remove the last "pushed" data element, and return the data "popped." "K" represents the number of ID bits that form the unique ID of the transponder.

In the preferred embodiment, at step 64 the interrogating system initializes the isolated transponder stack and proceeds to step 66. At step 66, the system initializes the non-isolated transponder stack and proceeds to step 68. At step 68, the interrogating system initializes the current bit string buffer and proceeds to step 70. At step 70, the system transmits a constant level of RF power for the duration of the RESET period and proceeds to step 72. At step 72, the interrogating system transmits a SYNC command and proceeds to step 74. At step 74, the system transmits a CHANGE1 command and continues to step 76.

At step 76, the interrogating system waits to receive a bit from the RF transponder; if no bit is detected, then the system proceeds to step 78; if a bit is detected, then the system proceeds to step 80. At step 78, the interrogating system stops because the algorithm is completed and the isolated transponder stack contains the identified transponder IDs. At step 80, the interrogating system determines whether both a one and a zero were detected; if both a one and a zero are present, then the system continues to step 88; if not, then the system proceeds to step 82. At step 82, the interrogating system records the bit received by appending it to the bit string buffer, and proceeds to step 84. At step 84, the system determines if the length of the bit string equal to K bits; if this criterion applies, then the system proceeds to step 104; if this criterion does not apply, then the system proceeds to step 86. At step 86, the interrogating system transmits a READ command and returns to step 76.

At step 80, if the interrogating system detects both a one and a zero, then it proceeds to step 88. At step 88, the system creates a copy of the current bit string and continues to step 90, where it appends a zero to the newly created copy of the bit string. The system then proceeds to step 92. At step 92, the interrogating system determines if the length of the newly created bit string is equal to K bits; if this criterion applies, then the system proceeds to step 94; if this criterion does not apply, then the system proceeds to step 96. At step 94, the interrogating system pushes the new bit string to the isolated transponder stack and continues to step 98. At step 96, the system pushes the new bit string to the non-isolated transponder stack and proceeds to step 98. At step 98, the interrogating system records a one as the bit received by appending it to the bit string buffer, and continues to step 100. At step 100, the interrogating system determines if the length of the bit string is equal to K bits again; if this criterion now applies, then the system proceeds to step 104; if this criterion does not apply, then the system proceeds to step 102, where it transmits a CHANGE2 command, and returns to step 76.

At step 104, assuming the length of the bit string is equal to K bits, the system pushes the current bit string to the isolated transponder stack, and continues to step 106. At step 106, the system initializes the current bit string buffer and proceeds to step 108. At step 108, the system determines if the non-isolated transponder stack is empty; if this criterion applies, then the system proceeds to step 78, where the system stops and the algorithm is completed; however, if this criterion does not apply, then the system proceeds to step 110. At step 110, the interrogating system pops the last entry from the non-isolated stack, and continues to step 112. At step 112, the system transmits a constant level of RF power for the duration of the RESET period, and proceeds to step 114. At step 114, the system transmits a SYNC signal, and continues to step 116. At step 116, the system transmits the bits in the popped bit string, and returns to step 74.

Figure 7:
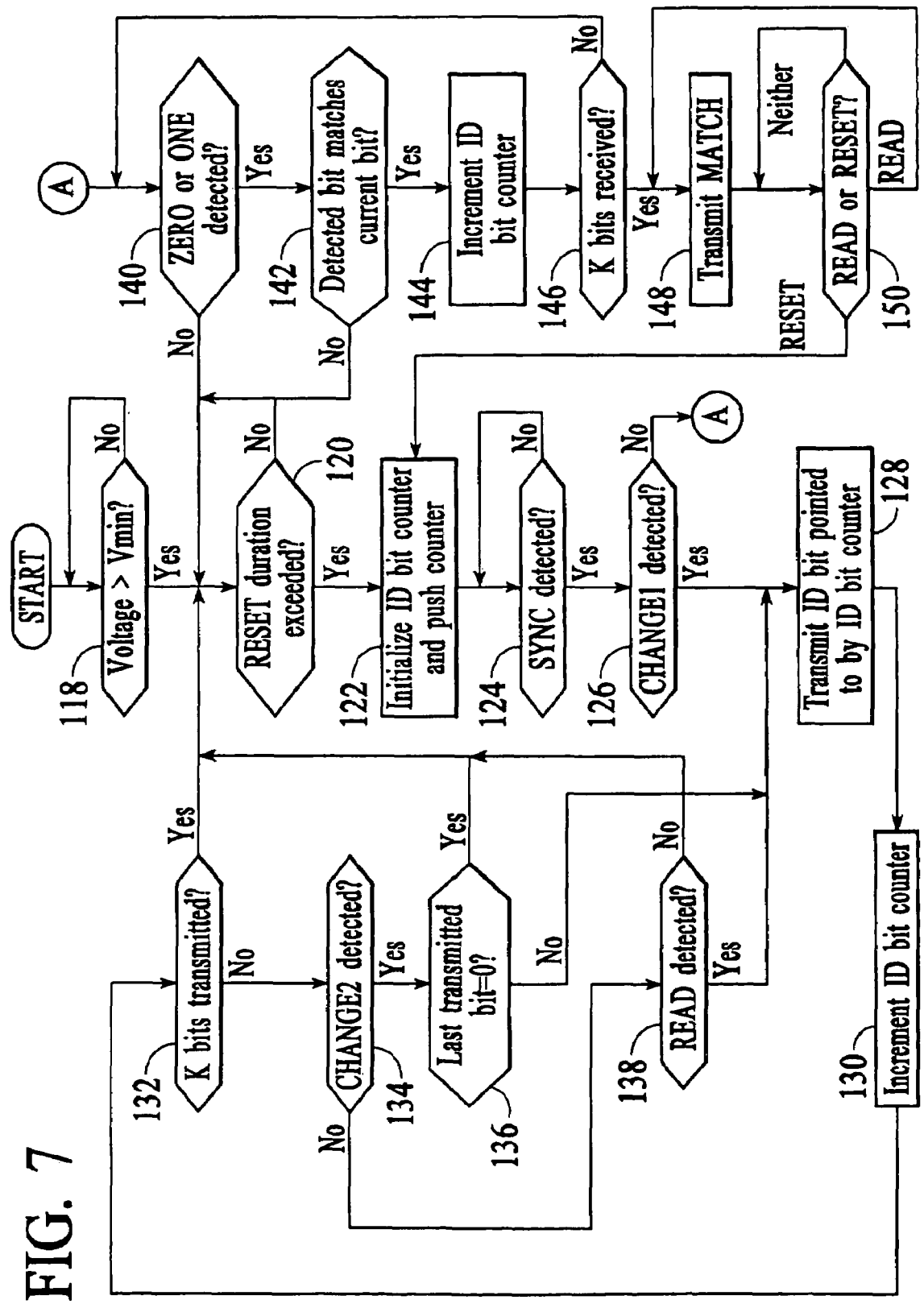
FIG. 7 is a flow chart of a representative algorithm for implementing the a preferred embodiment of the present invention, as it pertains to a transponder device.

FIG. 7 illustrates an algorithm that may be performed by each of the plurality of RFID transponders. Again, "K" represents the number of ID bits that form the unique ID of the transponder. It should be noted that it is implicit that the transponder will return to step 118 if at any time the RF illumination is not sufficient to keep the internal voltage at a satisfactory level, as discussed in greater detail below.

At step 118, the transponder device determines if the internal voltage level exceeds the voltage minimum (Vmin). If the internal voltage level is greater than Vmin, then the transponder device proceeds to step 120. However, if the internal voltage level is less than Vmin, then the device returns to step 118. (If at any time the RF illumination is not sufficient to keep the internal voltage at a satisfactory level, the device will return to step 118. This condition may be caused by movement of the transponder, movement of the interrogating system, and/or a change in the level of power being transmitted by the interrogating system.) At step 120, the transponder device determines if the RF illumination has been detected for a period equal to or greater than the RESET period. If this criterion applies, then the device continues to step 122; if this criterion does not apply, then the device repeats step 120.

At step 122, the transponder device resets the internal ID bit counter and proceeds to step 124, where it is determined if the SYNC command is detected; if this applies, then the device continues to step 126; if this criterion does not apply, then the device repeats step 124. At step 126, it is determined if the CHANGE1 command is detected; if this criterion applies, then the device proceeds to step 128; if this does not apply, then the device proceeds to step 140. At step 128, the device transmits the ID bit to the ID bit counter, and continues to step 130. At step 130, the device adds one to the ID bit counter, and proceeds to step 132. At step 132, the device determines if K bits have been transmitted; if this criterion applies, then the device returns to step 120; if this does not apply, then the device proceeds to step 134. At step 134, the device determines if the CHANGE2 command is detected; if this applies, then the device continues to step 136; if it does not apply, then the device proceeds to step 138. At step 136, the device determines if the last bit transmitted is equal to zero; if this applies, then the device proceeds to step 120; if this criterion does not apply, then device returns to step 128.

At step 138, the device determines if the READ command is detected; if this criterion applies, then the device returns to step 128; if it does not apply, then the device proceeds to step 120.

At step 140, the transponder device determines if a ZERO or ONE is detected; if so, then the device proceeds to step 142; if not, then the device returns to step 120. At step 142, the device determines if the bit detected matches the bit in this transponder's ID number that is pointed to by the current ID bit pointer; if so, then the device proceeds to step 144; if not, then the device returns to step 120. At step 144, the device adds one to the ID bit pointer and continues to step 146. At step 146, the device if the ID bit pointer equals K; if so, then the device proceeds to step 148; if not, then the device returns to step 140. At step 148, the device issues a MATCH command and proceeds to step 150.

At step 150, the device determines if the READ or RESET commands are detected; if the READ command is detected, then the device returns to step 148; if the RESET period has elapsed, then the device returns to step 122 to initialize an ID bit counter. If neither the READ nor RESET commands are detected, then the device repeats step 150.

One skilled in the art should recognize that the present invention could be implemented using variations in the order and number of steps in the algorithms in the interrogating system and in the transponder devices without departing from the spirit of the invention.

In addition, the shapes and durations of the symbols used to implement the invention are somewhat arbitrary, though the following relationships must hold in the preferred embodiment. First, the RESET duration must be greater than the duration of all other periods of continuous RF illumination encountered in the protocol, either due to a single symbol, or due to the concatenation of two or more symbols. Second, all symbols other than RESET must have a period of RF attenuation of a duration, which is sufficient to be detected by the RFID transponder. Third, CHANGE1 and CHANGE2 symbols must contain periods of RF attenuation, which occur before the end of either of the initial waiting periods contained in the RFID transponder's ZERO and ONE symbols. One skilled in the art also should recognize that the particular symbol shapes and symbol timing could be altered to produce variations of the previously described protocol, which are equivalent in function, and which retain the novel advantages of the protocol.

Figure 8:
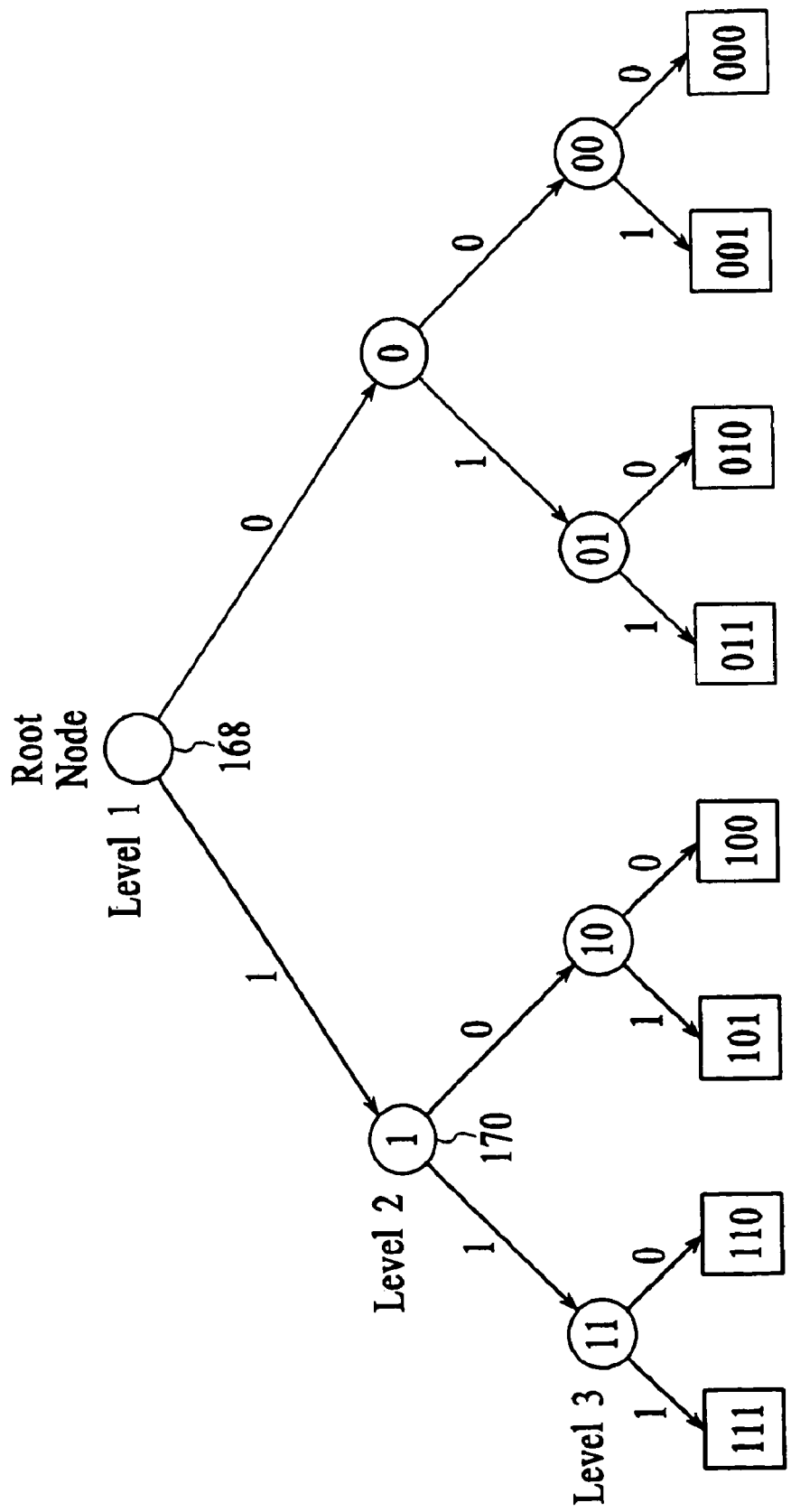
FIG. 8 represents a binary tree for illustrating the operation of the transponder protocol in a binary case embodiment of the present invention.

FIG. 8 is a diagram of a binary tree representing the search space of a method in accordance with a preferred embodiment. The diagram illustrates an exemplary embodiment of the transponder identification process. The dark arrows represent actual responses received when interrogating at the node from which the arrows originate. In the illustrative example for discussion purposes, the transponder ID numbers are binary and 3 bits in length. This will permit up to $2^3=8$ unique transponder ID numbers. One skilled in the art should recognize that the protocol could easily be extended to work with ID numbers of any finite length, and using any number system. For binary IDs of length K, there will be $2^K$ unique transponder ID numbers. In the illustrative example, transponders with binary IDs of 110, 101, and 100 are assumed to be present in the field.

As illustrated in FIG. 8, the search begins at the top or root node of the tree. At each node, the branches emerging from the bottom of the node represent the possible responses to an interrogation at that node. To start the transponder identification process, the interrogating system begins transmitting constant RF illumination to the transponders. The constant illumination is maintained long enough for the transponders to generate an internal voltage sufficient for powering the transponders, and long enough for the transponders to complete any initialization process which may be necessary. This includes the time required for the RESET command to be detected in the preferred embodiment. After the RESET symbol is detected by the transponders, the transponders will initialize their ID bit counters to point to the first bit to be interrogated.

The interrogating system will then command the transponders to respond with their first digit. This interrogation can be viewed as taking place at the root node of the binary tree in FIG. 8. In the preferred embodiment, the interrogation system would send a SYNC symbol followed by a CHANGE1 symbol. The CHANGE1 symbol will cause all transponders to respond with the first digit of their ID numbers. Since all transponders have a 1 as the MSB in this example, all transponders respond with a ONE symbol. This indicates to the interrogation system that at least one transponder is present in the field which contains a 1 as the first digit of its ID number. The interrogation system would then record that the current digit string is simply "1". Each transponder will increment its respective ID bit counter after transmitting its ID digit.

The interrogating system will then send a command to the transponders to request that each transponder respond with its second digit. In the preferred embodiment, this command would take the form of a READ symbol, and can be viewed as taking place on the leftmost node of level 2 in FIG. 8. The 110 transponder would respond with a ONE symbol, while the 101 and 100 transponders would respond with ZERO symbols. Each transponder will increment its respective ID bit counter after transmitting its ID digit. The interrogating system would then conclude that at least two transponders are present in the field. It would then record that the current digit string is "11", and also record that there is at least one transponder whose ID begins with "10" that needs to be isolated at a later time.

The interrogating system would then send a command to force all transponders which responded with a digit which was not ONE to enter an idle state. This command would take the form of a CHANGE2 symbol in the preferred embodiment. The CHANGE2 command simultaneously causes those transponders which responded with a ZERO to enter the idle state, and causes those transponders which responded with a ONE to respond with the next digit. This can be viewed as taking place at the leftmost node on level 3 of FIG. 8. At this point, only the 110 transponder will respond, and it will respond with a ZERO symbol. The interrogation system would then record the 110 transponder ID as an isolated transponder.

The interrogation system then sends out a RESET command to initiate the read interrogation process again. A SYNC command is sent, followed by a ONE and then a ZERO symbol to indicate to the transponders that it desires to communicate with only those transponders whose IDs begin with "10". The interrogation system then follows with a CHANGE1 symbol to command the transponders to respond with their final digit. This can be viewed as taking place at the node which is second from the left on level 3 of FIG. 8. The 100 transponder will respond with a ZERO symbol, and the 101 transponder will respond with a ONE symbol. The interrogating system then may conclude that there are at least two transponders in the field with IDs beginning with "10." Since IDs are in this case only 3 bits long, the 101 and 100 transponders will then enter an idle state until the next RESET symbol is received. The interrogation system can also assume that, since the final bit was just interrogated, transponders with IDs 100 and 101 are present in the field. The interrogation system then adds 100 and 101 to the list of isolated transponder IDs.

At this point, the interrogation system may assume that all tags which were in the field at the beginning of the protocol execution have been isolated. The interrogation system may then restart the protocol in order to find additional tags which may have entered the field since the beginning of the most recently completed interrogation process.

Although the invention has been described in conjunction with specific preferred and other embodiments, it is evident that many substitutions, alternatives and variations will be apparent to those skilled in the art in light of the foregoing description. Accordingly, the invention is intended to embrace all of the alternatives and variations that fall within the spirit and scope of the appended claims. For example, it should be understood that, in accordance with the various alternative embodiments described herein, various systems, and uses and methods based on such systems, may be obtained. The various refinements and alternative and additional features also described may be combined to provide additional advantageous combinations and the like in accordance with the present invention. Also as will be understood by those skilled in the art based on the foregoing description, various aspects of the preferred embodiments may be used in various subcombinations to achieve at least certain of the benefits and attributes described herein, and such subcombinations also are within the scope of the present invention. All such refinements, enhancements and further uses of the present invention are within the scope of the present invention.

What is claimed is:

1. A method for identifying a plurality of objects via interrogation over a communication channel, wherein each object to be identified includes an identification number having a plurality of digits, wherein each object has the ability to communicate either first or second responses to indicate a value of each of the digits contained in its respective identification number and wherein each object is operative in response to a plurality of predetermined commands each characterized by a predetermined signal timing, the method comprising the steps of:
   (a) activating the plurality of objects;
   (b) interrogating a single digit of the identification number from each currently activated object, wherein each of the plurality of objects communicates either the first or second response to indicate the value of the interrogated single digit of its respective identification number;
   (c) recording the value of each of the responses communicated in step (b);
   (d) signaling those objects which communicated the first response with a first one of the predetermined commands to enter a deactivated state when both the first response and the second response were communicated in step (b);
   (e) recording the sequence of responses received for those objects placed in the deactivated state in step (d), wherein there are recorded incomplete identification numbers for the objects in the deactivated state and the objects in the deactivated state will no longer respond until the step of activating is repeated;
   (f) repeating steps (b), (c), (d) and (e) until a complete identification number is obtained of at least one of the objects;
   (g) recording the complete identification number;
   (h) activating the plurality of objects;
   (i) transmitting one of the sequence of incomplete responses which was recorded in step (e) but not yet transmitted in this step, to the plurality of objects;
   (j) signaling the objects with identification sequences that do not begin with the sequence of incomplete responses to enter the deactivated state, and
   (k) repeating the steps (b), (c), (d), (e), (f), (g), (h), (i) and (j) until all of the incomplete sequences which may have been recorded in step (e) have been transmitted in step (i),
   wherein a completion time for the method is deterministic for a given number of objects.

2. The method of claim 1, wherein, if no object response is received in step (b), then the steps are alternatively terminating the method, and the step of activating the plurality of objects is performed again.

3. The method of claim 1, wherein the step of recording the complete identification numbers, comprises the step of identifying more than one identification number if multiple responses are detected by the interrogation device upon interrogating the last digit of an identification number, thereby eliminating the need to carry out steps (d) through (f) for the last digit.

4. The method of claim 1, wherein the identification numbers of the objects are obtained based on a depth-first tree traversal protocol.

5. The method of claim 1, wherein the communication channel comprises an RFID communication channel.

6. The method of claim 1, wherein the communication channel comprises a wired communication channel.

7. The method of claim 1, wherein a time required to obtain the identification numbers of the objects is deterministic.

8. The method of claim 1, wherein the objects comprise one or more items selected from the group consisting of clothing, luggage, furniture, computers, parcels, vehicles, warehouse inventory, components on an assembly line and documents.

9. A method for identifying one of a plurality of objects via interrogation over a communication channel, wherein each object includes an identification number having a plurality of digits, wherein each object has the ability to communicate either first or second responses to indicate a value of each of the digits contained in its respective identification number and wherein each object is operative in response to a plurality of predetermined commands each characterized by a predetermined signal timing, the method comprising the steps of:
   (a) activating the plurality of objects;
   (b) interrogating a single digit of the identification number from each activated object, wherein each of the plurality of objects communicates either the first or second response to indicate the value of the interrogated single digit of its respective identification number;
   (c) recording the value of each of the responses communicated in step (b);
   (d) signaling those objects which communicated the first response with a first one of the predetermined commands to enter a deactivated state when both the first response and the second response were communicated in step (b);
   (e) recording the sequence of responses received for those objects placed in the deactivated state in step (d), wherein there are recorded incomplete identification numbers for the objects in the deactivated state and the objects in the deactivated state will no longer respond until the step of activating is repeated; and
   (f) repeating steps (b), (c), (d) and (e) until a complete identification number is Obtained of the one of the plurality of objects, wherein a completion time for the method is deterministic for a given number of objects.

10. The method of claim 9, wherein the identification number of the one of the plurality of objects is obtained based on a depth-first tree traversal protocol.

11. The method of claim 9, wherein the communication channel comprises an RFID communication channel.

12. The method of claim 9, wherein the communication channel comprises a wired communication channel.

13. The method of claim 9, wherein a time required to obtain the identification numbers of the one of the plurality of objects is deterministic.

14. The method of claim 9, wherein the one of the plurality of objects comprises an item selected from the group consisting of clothing, luggage, furniture, computers, parcels, vehicles, warehouse inventory, components on an assembly line and documents.

15. A method for identifying one of a plurality of objects via interrogation over a radio frequency communication channel based on a depth-first tree traversal protocol, wherein each object includes an identification number having a plurality of digits, wherein each object has the ability to communicate either first or second responses to indicate a value of each of the digits contained in its respective identification number and wherein each object is operative in response to a plurality of predetermined commands each characterized by a predetermined signal timing, the method comprising the steps of:
   (a) activating the plurality of objects;
   (b) interrogating a single digit of the identification number from each activated object, wherein each of the plurality of objects communicates either the first or second response to indicate the value of the interrogated single digit of its respective identification number;
   (c) recording the value of each of the responses communicated in step (b);
   (d) signaling those objects which communicated the first response with a first one of the predetermined commands to enter a deactivated state when both the first response and the second response were communicated in step (b);
   (e) recording the sequence of responses received for those objects placed in the deactivated state in step (d), wherein there are recorded incomplete identification numbers for the objects in the deactivated state and the objects in the deactivated state will no longer respond until the step of activating is repeated; and
   (f) repeating steps (b), (c), (d) and (e) until a complete identification number is obtained of the one of the plurality of objects, wherein the complete identification number is obtained on a depth-first tree traversal protocol,
wherein a completion time for the method is deterministic for a given number of objects.

16. The method of claim 15, wherein each of the objects includes a semiconductor die with receiving and transmitting circuitry and an antenna bonded to the die, wherein the semiconductor die and the antenna are surrounded by a protective film.

17. The method of claim 15, wherein the communication channel comprises an RFID communication channel.

18. The method of claim 15, wherein the communication channel comprises a wired communication channel.

19. The method of claim 15, wherein a time required to obtain the identification numbers of the objects is deterministic.

20. The method of claim 15, wherein the objects comprise one or more items selected from the group consisting of clothing, luggage, furniture, computers, parcels, vehicles, warehouse inventory, components on an assembly line and documents.

* * * * *